United States Patent
Nishiumi et al.

(10) Patent No.: US 8,101,677 B2
(45) Date of Patent: Jan. 24, 2012

(54) MULTI-COMPONENT ROOM-TEMPERATURE-CURABLE SILICONE RUBBER COMPOSITION

(75) Inventors: Wataru Nishiumi, Chiba (JP); Hirotoki Morimoto, Chiba (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 422 days.

(21) Appl. No.: 12/088,485

(22) PCT Filed: Sep. 29, 2006

(86) PCT No.: PCT/JP2006/320039
§ 371 (c)(1),
(2), (4) Date: Mar. 28, 2008

(87) PCT Pub. No.: WO2007/037552
PCT Pub. Date: Apr. 5, 2007

(65) Prior Publication Data
US 2009/0281222 A1    Nov. 12, 2009

(30) Foreign Application Priority Data
Sep. 30, 2005 (JP) .................... 2005-286358

(51) Int. Cl.
*C08K 5/34* (2006.01)
*C08K 5/3435* (2006.01)
*C08G 77/60* (2006.01)
*C07F 7/02* (2006.01)

(52) U.S. Cl. .............. 524/98; 528/35; 556/408
(58) Field of Classification Search ......... 528/35; 524/98; 556/408
See application file for complete search history.

(56) References Cited

U.S. PATENT DOCUMENTS

| | | | | |
|---|---|---|---|---|
| 5,945,555 A * | 8/1999 | Yoshitake | ........... | 556/408 |
| 6,235,832 B1 * | 5/2001 | Deng et al. | ........... | 524/525 |
| 2001/0034403 A1 * | 10/2001 | Takuman et al. | ........... | 524/588 |

FOREIGN PATENT DOCUMENTS

| | | |
|---|---|---|
| EP | 0354267 A1 | 2/1990 |
| EP | 1045002 A1 | 10/2000 |
| GB | 1394206 | 5/1975 |
| JP | 63270762 A | 11/1988 |
| JP | 64060656 A | 3/1989 |
| JP | 04013767 A | 1/1992 |
| JP | 10101381 A | 4/1998 |
| JP | 10195085 A | 7/1998 |
| JP | 11060952 A | 3/1999 |
| JP | 2003221506 A * | 8/2003 |

OTHER PUBLICATIONS

English language abstract for JP 63270762 extracted from espacenet.com database, dated Dec. 1, 2008.
English language abstract for JP 64060656 extracted from PAJ database, dated Dec. 1, 2008.
English language abstract for JP 04013767 extracted from PAJ database, dated Dec. 1, 2008.
English language translation for JP 10101381 extracted from PAJ database, dated Dec. 1, 2008, 48 pages.
English language translation for JP 10195085 extracted from PAJ database, dated Dec. 1, 2008, 70 pages.
English language translation for JP 11060952 extracted from PAJ database, dated Dec. 1, 2008, 60 pages.
English language translation for JP 2003221506 extracted from PAJ database, dated Dec. 1, 2008, 50 pages.
PCT International Search Report for PCT/JP2006/320039, dated Mar. 15, 2007, 4 pages.

* cited by examiner

*Primary Examiner* — Katarzyna Wyrozebski Lee
*Assistant Examiner* — Anthony H Sheh
(74) *Attorney, Agent, or Firm* — Howard & Howard Attorneys PLLC

(57) ABSTRACT

A multi-component room-temperature-curable silicone rubber composition comprising at least: (A) a diorganopolysiloxane, (B) a methoxy group-containing silicon compound comprising a bis(methoxysilyl)alkane or a organotrimethoxysilane (except amino group containing organotrimethoxysilane) (B-1), a methoxy group-containing carbasilatrane derivative (B-2), and an aminoalkylmethoxysilane (B-3) (wherein the weight ratio of constituent (B-2) to constituent (B-3) is in the range of (20:80) to (80:20)); and (C) a curing catalyst, the composition being packaged as two or more separately stored compositions wherein none of said separately stored compositions contain all said components (A), (B), and (C) simultaneously.

22 Claims, No Drawings ved from a condition is desired to provide a multi-component room-temperature-curable silicone rubber composition that is characterized by rapid curing, fast and effective adherence to various substrates, maintaining strong adhesion to substrates even under severe operating conditions

MULTI-COMPONENT ROOM-TEMPERATURE-CURABLE SILICONE RUBBER COMPOSITION

RELATED APPLICATIONS

This application claims priority to and all the advantages of International Patent Application No. PCT/JP2006/320039, filed on Sept. 29, 2006, which claims priority to Japanese Patent Application No. JP 2005-286358, filed on Sept. 30, 2005.

TECHNICAL FIELD

The present invention relates to a multi-component room-temperature-curable silicone rubber composition.

BACKGROUND ART

It is known that some specific multi-component room-temperature-curable silicone rubber compositions in the form of two separately stored compositions, the properties of which are not affected by atmospheric moisture, are widely used as sealing materials that possess excellent deep curability and allows uniform curing throughout the entire body of the sealing material, i.e., from the surface to the inner part. For example, Japanese Unexamined Patent Application Publication (hereinafter referred to as "Kokai") S48-37452 discloses a two-package-type liquid room-temperature-curable silicone rubber composition comprising the following: a base composition composed of a filler and a diorganopolysiloxane capped at molecular terminals with silanol groups; and a catalyst composition consisting of an alkyl silicate, an amino-functional silane, and a curing catalyst. However, the silicone rubber obtained by curing the aforementioned room-temperature-curable silicone rubber composition is subject to deterioration of its long term adhesion durability against water. The reduction in adhesive properties and rubber-like characteristics is especially noticeable when the aforementioned silicone rubber is used in severe conditions, e.g., such as immersion in hot water.

In order to prevent the reduction in adhesive characteristics after immersion in hot water, it was proposed to use the aforementioned two-package type liquid room-temperature-curable silicone rubber composition with a curing agent in the form of 1,2-bis(trimethoxysilyl) ethane or 1,6-bis(trimethoxysilyl) hexane, or a similar disilylalkane composition and with an adhesion promoter in the form of a carbasilatrane compound (see Kokai S64-60656 and Kokai 2003-221506). However, the aforementioned multi-component room-temperature-curable silicone rubber compositions are characterized by a slow speed of curing and curability insufficient for use in fields such as manufacture of multiple-pane insulating glass units. In view of the above, it is desired to provide a multi-component room-temperature-curable organopolysiloxane that would combine good long term adhesion durability against water with rapid curing that would shorten production time.

DISCLOSURE OF INVENTION

It is an object of the present invention to provide a multi-component room-temperature-curable silicone rubber composition that is characterized by rapid curing, fast and effective adherence to various substrates, maintaining strong adhesion to substrates even under severe operating conditions such as immersion in hot water, and preserving rubber-like properties with little change over time.

The above problem can be solved by the present invention that provides a multi-component room-temperature-curable silicone rubber composition comprising at least:

(A) 100 parts by weight of a diorganopolysiloxane that has a viscosity in the range of 20 to 1,000,000 mPa·s at 25° C. and that comprises: 20 to 100 parts by weight of a diorganopolysiloxane (A-1) capped at both molecular terminals with alkoxysilyl groups or hydroxysilyl groups, and 0 to 80 parts by weight of a diorganopolysiloxane (A-2) capped at one molecular terminal with an alkoxysilyl group or a hydroxysilyl group and capped at the other molecular terminal with an alkyl group or an alkenyl group;

(B) a methoxy group-containing silicon compound comprising a bis(methoxysilyl)alkane or an organotrimethoxysilane (except amino group containing organotrimethoxysilane) (B-1), a methoxy group-containing carbasilatrane derivative (B-2), and an aminoalkylmethoxysilane (B-3)(wherein constituent (B-1) is used in an amount of 0.5 to 15 parts by weight per 100 parts by weight of component (A), wherein the total amount of constituents (B-2) and (B-3) is in the range of 0.1 to 10 parts by weight per 100 parts by weight of component (A), and wherein the weight ratio of constituent (B-2) to constituent (B-3) is in the range of (20:80) to (80:20)); and (C) 0.001 to 20 parts by weight of a curing catalyst, and the composition being packaged as two or more separately stored compositions wherein none of said separately stored compositions contain all said components (A), (B), and (C) simultaneously.

The aforementioned multi-component room-temperature-curable silicone rubber composition may have constituent (B-1) in the form of a bis(methoxysilyl)alkane selected from the group consisting of 1,6-bis(trimethoxysilyl) hexane, 1,7-bis(trimethoxysilyl) heptane, 1,8-bis(trimethoxysilyl) octane, 1,9-bis(trimethoxysilyl) nonane, and 1,10-bis(trimethoxysilyl) decane, constituent (B-3) in the form of N-(β-aminoalkyl) Aminoalkylorganodimethoxysilane or N-(β-aminoalkyl)aminoalkyltrimethoxysilane, and component (C) in the form of an organic tin compound.

The aforementioned multi-component room-temperature-curable silicone rubber composition may be further combined with a fine powder of calcium carbonate (D) added in the amount of 10 to 200 parts by weight per 100 parts by weight of component (A). The aforementioned multi-component room-temperature-curable silicone rubber composition may be packaged as a separately stored composition (I) which contains components (A) and (D) and does not contain components (B) and (C) and a separately stored composition (II) that contains components (B) and (C) and does not contain component (A).

The aforementioned multi-component room-temperature-curable silicone rubber composition can be used as a construction sealing material, a sealing material for insulating glass units, and, in particular, as a secondary sealing material for multiple-pane insulating glass units.

The multi-component room-temperature-curable silicone rubber composition of the invention possesses excellent deep curability, and since the composition is quickly curable, it allows rapid adhesion to various substrates made from glass, plastics, metal, etc. Silicone rubber obtained by curing the aforementioned composition essentially does not lose its rubber-like characteristics and maintains adhesion durability against water even under harsh operating conditions such as immersion into hot water, or the like.

BEST MODE FOR CARRYING OUT THE INVENTION

The multi-component room-temperature-curable silicone rubber composition of the invention will now be described in more detail. The multi-component room-temperature-curable silicone rubber composition of the invention comprises at least:

(A) 100 parts by weight of a diorganopolysiloxane that has a viscosity in the range of 20 to 1,000,000 mPa·s at 25° C. and that comprises: 20 to 100 parts by weight of a diorganopolysiloxane (A-1) capped at both molecular terminals with alkoxysilyl groups or hydroxysilyl groups, and 0 to 80 parts by weight of a diorganopolysiloxane (A-2) capped at one molecular terminal with an alkoxysilyl group or a hydroxysilyl group and capped at the other molecular terminal with an alkyl group or an alkenyl group;

(B) a methoxy group-containing silicon compound comprising a bis(methoxysilyl)alkane or an organotrimethoxysilane (except amino group containing organotrimethoxysilane) (B-1), a methoxy group-containing carbasilatrane derivative (B-2), and an aminoalkylmethoxysilane (B-3) (wherein constituent (B-1) is used in an amount of 0.5 to 15 parts by weight per 100 parts by weight of component (A), wherein the total amount of constituents (B-2) and (B-3) is in the range of 0.1 to 10 parts by weight per 100 parts by weight of component (A), and wherein the weight ratio of constituent (B-2) to constituent (B-3) is in the range of (20:80) to (80:20)); and (C) 0.001 to 20 parts by weight of a curing catalyst.

Component (A) is one of the main components of the aforementioned multi-component room-temperature-curable silicone rubber composition. This component is a diorganopolysiloxane that consists of a diorganopolysiloxane (A-1) capped at both molecular terminals with alkoxysilyl groups or hydroxysilyl groups, and a diorganopolysiloxane (A-2) capped at one molecular terminal with an alkoxysilyl group or a hydroxysilyl group and capped at the other molecular terminal with an alkyl group or an alkenyl group.

It is recommended to use constituents (A-1) and (A-2) in a weight ratio of (A-1):(A-2)=(100:0) to (20:80), preferably (A-1):(A-2)=(100:0) to (60:40), even more preferably (A-1):(A-2)=(95:5) to (70:30), and the most preferably, (A-1):(A-2)=(95:5) to (80:20). If constituent (A-2) is contained in component (A) in a ratio above the upper recommended limit, this will either reduce the strength of the silicone rubber obtained as a result of curing of the composition of the invention, or will impair adhesion of the rubber to the substrate after immersion into hot water.

Furthermore, if the viscosity of constituents (A-1) and (A-2) is too low, this will reduce strength of the silicone rubber obtained by curing the composition, and, if, on the other hand, the aforementioned constituents are too viscous, this will affect the handling properties at production of the composition or at use of the composition. Therefore, it is recommended that the constituents (A-1) and (A-2) have viscosities in the range of 20 to 1,000,000 mPa·s, preferably, in the range of 100 to 100,000 mPa·s, at 25° C. Preferable constituent (A-1) is a diorganopolysiloxane of the following general formula:

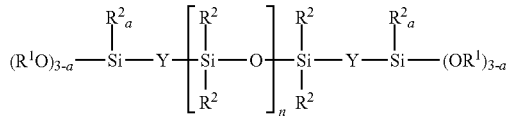

In this formula, $R^1$ represents a group that may be selected from a hydrogen atom, a methyl, ethyl, propyl, butyl, octyl, or a similar alkyl group having 1 to 10 carbon atoms; a methoxymethyl, methoxyethyl, ethoxymethyl, ethoxyethoxy, or a similar alkoxyalkyl group. Among these, hydrogen atom, a methyl group, and ethyl group are preferable. $R^2$ represents a group that may be selected from a univalent hydrocarbon group, halogenated hydrocarbon group, or a cyanoalkyl group. More specifically, $R^2$ may be exemplified by a methyl, ethyl, propyl, butyl, octyl, or a similar alkyl group having 1 to 10 carbon atoms; a cyclopentyl, cyclohexyl, or a similar cycloalkyl group; a vinyl, allyl, or a similar alkenyl group; a phenyl, tolyl, naphthyl, or a similar aryl group; a benzyl, phenylethyl, phenylpropyl, or a similar aralkyl group; a trifluoropropyl, chloropropyl, or a similar halogenated hydrocarbon group; β-cyanoethyl, γ-cyanopropyl, or a similar cyanoalkyl group. Most preferable is a methyl group. When $R^1$ is an alkyl group or an alkoxyalkyl group, "a" is 0, 1, or 2. When $R^1$ is a hydrogen atom, "a" is 2. "n" is a number that provides viscosity in the range of 20 to 1,000,000 mPa·s at 25° C.

In the above formula, Y represents an oxygen atom, a bivalent hydrocarbon group, or a group of the following general formula:

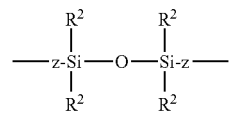

(where $R^2$ is the same as defined above, and Z is a bivalent hydrocarbon group). The bivalent hydrocarbon group is represented by a methylene, ethylene, propylene, butylenes, hexene, or a similar alkylene group having 1 to 10 carbon atoms.

Methods of preparation of constituent (A-1) are known and described, e.g., in Kokoku H03-4566 and Kokai S63-270762.

In the composition of the invention, constituent (A-2) works so that it either reduces modulus of elasticity of a silicone rubber obtained by curing the composition or improves adhesion to hard-to-adhere substrates. Preferable constituent (A-2) is a diorganopolysiloxane of the following general formula:

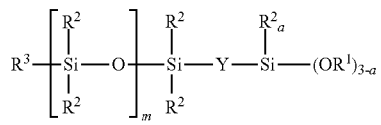

In this formula, $R^1$, $R^2$, Y, and "a" have the same meanings as defined earlier; $R^3$ represents a methyl, ethyl, propyl, butyl, octyl, or a similar alkyl group having 1 to 10 carbon atoms; or a vinyl, allyl, or a similar alkenyl group. Most preferable is an alkyl group with 1 to 10 carbon atoms, especially, a methyl group. In the above formula, "m" is a number that provides viscosities in the range of 20 to 1,000,000 mPa·s at 25° C.

Methods of preparation of constituent (A-2) are known and described, e.g., in Kokai H04-13767 and Kokai S63-270762.

Component (B) is a methoxy group-containing silicon compound that comprises a bis(methoxysilyl)alkane or an organotrimethoxysilane (except amino group containing organotrimethoxysilane) (B-1), a methoxy group-containing carbasilatrane derivative (B-2), and an aminoalkylmethoxysilane (B-3). Component (B) reacts with component (A) in combination with below-described component (C), thus causing cross-linking of the composition, and, at the same time, imparts rapid cure and adhesion to various substrates. In particular, the aforementioned component (B) imparts long term adhesion durability against water to the cured body of the composition of the invention.

In the presence of below-described component (C), constituent (B-1) works as a cross-linking agent for component (A). Constituent (B-1) is a bis(methoxysilyl)alkane or an organotrimethoxysilane. A bis(methoxysilyl)alkane and a organotrimethoxysilane can be used in combination. The aforementioned organotrimethoxysilane does not contain any amino containing group.

A preferable constituent (B-1) is an organotrimethoxysilane. Silicon atom bonding organic groups other than methoxy group of the organotrimethoxysilane is selected from a optionally substituted monovalent hydrocarbon groups having 1 to 20 carbon atoms or halogenated monovalent hydrocarbon groups having 1 to 20 carbon atoms, except an organic group containing amino group. Among the aforementioned groups optionally substituted monovalent hydrocarbon groups having 1 to 20 carbon atoms is preferable. The monovalent hydrocarbon groups having 1 to 20 carbon atoms is represented by a methyl, ethyl, propyl, butyl, t-butyl, octyl, decyl, dodecyl, eicosyl, or a similar alkyl group; a cyclopentyl, cyclohexyl, or a similar cycloalkyl group; a vinyl, allyl, or a similar alkenyl group; a phenyl, tolyl, naphthyl, or a similar aryl group; a benzyl, phenylethyl, phenylpropyl, or a similar aralkyl group; a trifluoropropyl, chloropropyl, or a similar halogenated hydrocarbon group; β-cyanoethyl, γ-cyanopropyl, or a similar cyanoalkyl group; or a substituted aforementioned group. Among the aforementioned groups, an alkyl groups having 2-20 carbon atoms is preferable.

Specific examples of Preferable organotrimethoxysilane are the following: butyltrimethoxysilane, t-butylrrimethoxysilane, octyltrimethoxysilane, decyltrimethoxysilane, phenyltrimethoxysilane, vinyltrimethoxysilane, hexenyltrimethoxysilane, 3-glycidoxypropyltrimethoxysilane, 3-methacliloxypropyltrimethoxysilane, 3-(trimethoxysilyl)propylisocyanic ester.

The other preferable constituent (B-1) is a bis(methoxysilyl)alkane compound of the following general formula (4):

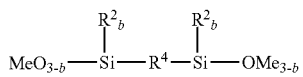

In this formula, OMe is a methoxy group, $R^2$ is the same as defined above, and "b" is 0 or 1, where 0 is preferable. $R^4$ designates an optionally substituted alkylene group having 2 to 10 carbon atoms. Most preferable is an optionally substituted alkylene with 5 to 10 carbon atoms. Specific examples of such groups are the following: butylene, pentylene, hexylene, heptylene, octylene, nonylene, decylene, or a similar alkylene group; or any of the aforementioned groups where hydrogen atom is substituted with a methyl, ethyl, propyl, butyl, cyclopentyl, cyclohexyl, vinyl, allyl, 3,3,3-trifluoropropyl, or a 3-chloropropyl group. Most preferable are linear-chain unsubstituted alkylene groups with 5 to 10 carbon atoms. This is because such groups are easily available, have low volatility (which is convenient for production), and demonstrate stable curability and adhesive properties.

Specific examples of bis(methoxysilyl)alkane are the following: 1,4-bis (trimethoxysilyl) butane, 1-methyldimethoxysilyl-4-trimethoxysilyl butane, 1,4-bis (methyldimethoxysilyl) butane, 1,5-bis(trimethoxysilyl) pentane, 1,4-bis (trimethoxysilyl) pentane, 1-methyldimethoxysilyl-5-trimethoxysilyl pentane, 1,5-bis(methyldimethoxysilyl) pentane, 1,6-bis(trimethoxysilyl) hexane, 2,5-bis(trimethoxysilyl) hexane, 1,6-bis (methyldimethoxysilyl) hexane, 1,7-bis(trimethoxysilyl) heptane, 2,5-bis(trimethoxysilyl) heptane, 2,6-bis(trimethoxysilyl) heptane, 1,8-bis (trimethoxysilyl) octane, 2,5-bis (trimethoxysilyl) octane, 2,7-bis(trimethoxysilyl) octane, 1,9-bis(trimethoxysilyl) nonane, 2,7-bis(trimethoxysilyl) nonane, 1,10-bis(trimethoxysilyl) decane, and 3,8-bis (trimethoxysilyl) decane. These compounds can be used individually or in a mixture of two or more. Most preferable of the above are the following: 1,6-bis(trimethoxysilyl) hexane, 1,7-bis(trimethoxysilyl) heptane, 1,8-bis(trimethoxysilyl) octane, 1,9-bis(trimethoxysilyl) nonane, and 1,10-bis(trimethoxysilyl) decane. Especially preferable is 1,6-bis (trimethoxysilyl) hexane. This is because this compound has low volatility, does not affect curability and adhesive properties of the multi-component room-temperature-curable silicone rubber composition of the invention when it is mixed and is subjected to defoaming, and because it improves workability and performance characteristics of the composition.

A bis(methoxysilyl)alkane is produced by a known method, i.e., by causing a hydrosilylation reaction between a diene and a trimethoxysilane or an organodimethoxysilane.

Constituent (B-1) should be used in an amount of 0.5 to 15 parts by weight per 100 parts by weight of component (A), but when $R^1$ in aforementioned formula (I) of component (A) represents a hydrogen atom, it is recommended to use constituent (B-1) is such an amount that the mole number of methoxy groups in constituent (B-1) exceeds the mole number of silanol groups in component (A). Furthermore, when $R^1$ in aforementioned formula (I) of component (A) represents an alkyl group or an alkoxyalkyl group, constituent (B-1) should be used in an amount of 2 to 15 parts by weight per 100 parts by weight of component (A).

In coexistence with below-described constituent (B-3), constituent (B-2) imparts to the composition of the invention improved adhesive properties, as well as improved adhesion durability against water and, in particular, against the effect of hot water. Constituent (B-2) is a methoxy group-containing carbasilatrane derivative of the following general formula:

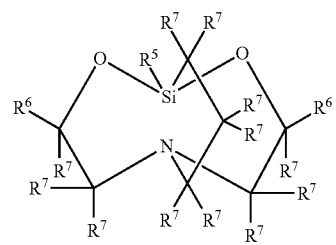

In this formula, $R^5$ designates a methyl, ethyl, propyl, butyl, octyl, or a similar alkyl group having 1 to 10 carbon atoms, or a methoxy group; both $R^6$ may be the same or different and is selected from the groups represented by the following formulae:

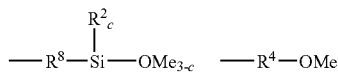

(where $R^8$ represents an optionally substituted alkylene group having 2 to 10 carbon atoms, preferably an optionally substituted alkylene having 5 to 7 carbon atoms, or a methoxymethyl group; a methoxyethyl, ethoxyethyl, ethoxyethoxy or a similar alkyleneoxyalkylene group; OMe, $R^2$, and $R^4$ are the same as defined above; and "c" is 0, 1, or 2); $R^7$ may be the same or different and may represent hydrogen atoms, or methyl, ethyl, propyl, butyl, octyl, or similar alkyl groups having 1 to 10 carbon atoms.

The methoxy group-containing carbasilatrane derivative of constituent (B-2) can be produced, e.g., by uniformly mixing and causing an amino-containing alkoxysilane of the following general formula:

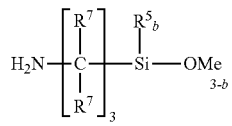

(where OMe, $R^5$, $R^7$, and "b" are the same as defined above) to react with an epoxy compound represented by the following general formula:

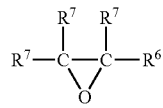

(where $R^6$ and $R^7$ are the same as defined above), the epoxy compound being used in an amount of 1.5 to 3.0 moles per 1 mole of the amino-containing alkoxysilane. The reaction between the above compounds may be carried out with uniform mixing at room temperature or, if necessary, with heating.

Constituent (B-3) is one that, when used in combination with aforementioned constituent (B-2), improves adhesive properties of the composition of the invention and, especially, accelerates curing. Constituent (B-3) is an aminoalkylmethoxysilane of the following general formula:

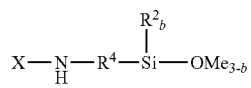

In this formula, X designates a hydrogen atom or an aminoethyl group, aminopropyl group, or a similar aminoalkyl group; and OMe, $R^2$, $R^4$, and "b" are the same as defined above. The following are specific examples of constituent (B-3): γ-aminopropyl methyldimethoxysilane, or a similar aminoalkyl organodimethoxysilane; γ-aminopropyl trimethoxysilane, or a similar aminoalkyl trimethoxysilane; N-(β-aminoethyl)aminopropyl methyldimethoxysilane, or a similar N-(β-aminoalkyl)aminoalkyl organodimethoxysilane; and N-(β-aminoethyl)aminopropyl trimethoxysilane, or a similar N-(β-aminoalkyl)aminoalkyl trimethoxysilane. N-(β-aminoalkyl)aminoalkyl organodimethoxysilane or N-(β-aminoalkyl)aminoalkyltrimethoxysilane are preferable. The most preferable is N-(β-aminoalkyl)aminoalkyl trimethoxysilane.

Constituents (B-2) and (B-3) should be used in an amount such that the sum of these constituents is in the range of 0.1 to 10 parts, preferably 0.5 to 5 parts by weight, per 100 parts by weight of component (A). If the aforementioned constituents are used in an amount of less than the lower recommended limit, the composition will not acquire sufficient adhesiveness, and if, on the other hand, these constituents are used in an amounts exceeding the upper recommended limit, this will either impair curability of the composition or will increase hardness of the silicone rubber obtained after curing.

Constituents (B-2) and (B-3) can be used in a ratio of (20:80) to (80:20), preferably in the range of (30:70) to (70:30), and even more preferably, (40:60) to (70:30). If constituent (B-2) is used in a ratio below the lower recommended limit, this will impair properties of the composition that provide long term adhesion durability against water. If constituent (B-2) is used in a ratio above the upper recommended limit, the composition will either lose its rapid curing properties, or the time of adherence to hard-to-adhere substrates, e.g., those coated with heat-ray reflecting metal films applied by means of a vapor deposition technique, will be delayed. If constituent (B-3) is used in a ratio below the lower recommended limit, the composition will either lose it property of rapid curing, or the time required for adherence to hard-to-adhere substrates, e.g., those having surfaces coated with thin heat-ray reflecting metal films, will be delayed. If constituent (B-3) is used in a ratio above the upper recommended limit, this will impair long term adhesion durability against water.

Curing catalyst (C) suitable for the composition of the present invention may be exemplified by an organic salt of a metal such as tin, titanium, zirconium, iron, antimony, bismuth, manganese, or the like; an organic titanic acid ester compound, and an organic titanium chelate compound. More specific examples of the aforementioned curing agents are the following: dimethyl tin dilaurate, dimethyl tin dioctoate, dimethyl tin dineodecanoate, dibutyl tin dilaurate, dibutyl tin dioctoate, dibutyl tin dineodecanoate, or a similar dialkyl tin dicarboxylic acid; stannous octoate, or a similar organic tin compound, tetrabutyl titanate, tetraisopropyl titanate, diisopropoxy bis(acetyl acetone) titanium, and diisopropoxy bis (ethylacetoacetate) titanium, or a similar organic titanium compound. Among the above compounds, most preferable from the viewpoint of such properties of the composition of the invention as rapid curing and deep curing, are organic tin compounds, especially the dialkyl tin dicarboxylic acid. Component (C) should be used in an amount of 0.001 to 20 parts by weight, preferably 0.01 to 5 parts by weight per 100 parts by weight of component (A).

If it is necessary to further improve deep curing properties and mechanical strength of a body obtained by curing the composition, components (A), (B), and (C) may be combined with a fine powder of calcium carbonate of component (D). Component (D) may be exemplified by a heavy (or ground) calcium carbonate powder, light (or precipitated) calcium carbonate powder, or the aforementioned calcium carbonate powders surface treated with fatty acids, resin acids, or similar organic acids. Most preferable is the light (or precipitated) calcium carbonate powder, especially the light (or precipitated) calcium carbonate powder surface-treated with fatty acids, resin acids, or similar organic acids. There are no special restrictions with regard to BET specific surface area of component (D), but it is recommended to have this characteristic in the range of 5 to 50 m²/g, preferably, 10 to 50 m²/g.

Component (D) should be used in an amount of 10 to 200 parts by weight, preferably, 30 to 150 parts by weight per 100 parts by weight of component (A). If component (D) is added in an amount of less than the lower recommended limit, it will be impossible to improve the desired properties, and, if, on the other hand, component (D) is used in an amount exceeding the upper recommended limit, this will impair workability of the composition.

If necessary, within the limits not detrimental to the objects of the present invention, a mixture of components (A) through (C), or (A) through (D) may be further combined with conventional additives known in the preparation of room-temperature-curable silicone rubber compositions. Such additives may be exemplified by fumed silica, precipitated silica, fine quartz powder, titanium dioxide powder, diatomaceous earth, aluminum hydroxide powder, fine alumina powder, magnesia powder, zinc oxide powder, the aforementioned fine powders surface coated with silanes, silazanes, low-degree-polymerization polysiloxanes, or other finely powdered inorganic fillers. Such inorganic fillers can be used in an amount of 10 to 200 parts by weight, preferably, 30 to 150 parts by weight per 100 parts by weight of component (A). Other additives may comprise diphenyl dimethoxysilane, dimethyl dimethoxysilane, or similar dialkoxysilanes, a dimethyl polysiloxane capped at both molecular terminals with trimethylsiloxy groups; a platinum-type catalyst, zinc carbonate powder, or other flame retardants, plasticizers, thixotropy imparters, mildew-proofing agents, pigments, organic solvents, etc.

The multi-component room-temperature-curable silicone rubber composition of the invention is packaged two or more separately stored compositions. The aforementioned multi-component room-temperature-curable silicone rubber composition, which is composed of a two or more separately stored compositions is characterized by excellent properties of rapid and deep curing, as well as by drastically improved stability in storage. It is required that none of the individual separately stored compositions that together constitute the aforementioned multi-component composition contain all components (A), (B), and (C) simultaneously. When all three components (A), (B), and (C) are present in an individual composition, this individual composition will lose its storage stability, and will cure.

The following are specific examples of component combinations from which the multi-component room-temperature-curable silicone rubber composition of the invention may be composed:

a two-component room-temperature-curable silicone rubber composition comprising a separately stored composition (I) that contains component (A), if necessary, in combination with component (D), but does not contain components (B) and (C), and a separately stored composition (II) that contains components (B) and (C), if necessary, with other aforementioned additives, but does not contain component (A);

a two-component room-temperature-curable silicone rubber composition comprising a separately stored composition (I) that contains component (A) and component (B), if necessary, in combination with component (D), but does not contain component (C), and a separately stored composition (II) that contains component (C), if necessary, with other aforementioned additives but does not contain components (A) and (B);

a two-component room-temperature-curable silicone rubber composition comprising a separately stored composition (I) that contains a part of component (A), component (B), and, if necessary, component (D), but does not contain component (C), and a separately stored composition (II) that contains component (C), the remaining part of component (A), and, if necessary, other aforementioned additives, but does not contain component (B); and a two-component room-temperature-curable silicone rubber composition comprising a separately stored composition (I) that contains component (A), a part of component (B), and, if necessary, component (D), but does not contain component (C), and a separately stored composition (II) that contains component (C), the remaining part of component (B), and, if necessary, other aforementioned additives, but does not contain component (A).

The following are further specific examples of component combinations from which the multi-component room-temperature-curable silicone rubber composition of the invention may be composed:

a three-component room-temperature-curable silicone rubber composition comprising a separately stored composition (I) that contains component (A), if necessary, in combination with component (D), but does not contain components (B) and (C), a separately stored composition (II) that contains component (C), if necessary, with other aforementioned additives, but does not contain components (A) and (B), and a separately stored composition [III] that contain component (B), if necessary, with other aforementioned additives, but does not contain components (A) and (C);

a three-component room-temperature-curable silicone rubber composition comprising a separately stored composition (I) that contains component (A), if necessary, in combination with component (D), but does not contain components (B) and (C), a separately stored composition (II) that contains components (C) and (B), and does not contain component (A), and a separately stored composition [III] that contain other aforementioned additives, and does not contain components (A), (B), and (C); and a three-component room-temperature-curable silicone rubber composition comprising a separately stored composition (I) that contains a part of component (A), if necessary, in combination with component (D), but does not contain components (B) and (C), a separately stored composition (II) that contains components (C) and (B), if necessary, with other aforementioned additive, but does not contain component (A), and a separately stored composition [III] that contains the remaining part of component (A) and, if necessary, other aforementioned additives, but does not contain components (B) and (C).

Among the above-mentioned multi-component room-temperature-curable silicone rubber compositions, most preferable is a two-component room-temperature-curable silicone rubber composition comprising a separately stored composition (I) that contains component (A), if necessary, in combination with component (D), but does not contain components (B) and (C), and a separately stored composition (II) that contains components (B) and (C), if necessary, with other aforementioned additives, but does not contain component (A). This multi-component composition is preferable because it can be easily produced and makes it possible to obtain various multi-component room-temperature-curable silicone rubber compositions with desired characteristics such as rapid curing, adhesive properties, or the like selected in accordance with methods of manufacturing and use by using one type of composition (I) and changing the content and ratios of components of composition (II).

Prior to use the multi-component room-temperature-curable silicone rubber composition, the aforementioned separately stored compositions are mixed. Mixing can be carried out, e.g., by feeding various components of the multi-component composition from the storage container by means of a dosing pump to a static mixer where the components can be mixed. For convenience of defoaming the admixture, it is recommended to mix the separately stored components of the multi-component room-temperature-curable silicone rubber composition in an open-type mixer.

The multi-component room-temperature-curable silicone rubber composition of the invention is characterized by rapid curing after mixing separately stored components that compose the multi-component room-temperature-curable silicone rubber composition. The term "rapid curing" means that the time required at 25° C. to reach 60% of the cured-body final hardness measured by a type-A durometer in accordance with JIS $K_{6253}$ does not exceed six hours.

The multi-component room-temperature-curable silicone rubber composition of the invention demonstrates excellent adhesion to substrates made from glass, porcelain, mortar, concrete, wood, aluminum, copper, stainless steel, iron, galvanized steel, brick, brass, zinc, epoxy resin, phenol resin, etc. The composition can also demonstrate good adhesion to substrates made from polycarbonate resin, polyester resin, ABS resin, nylon resin, polyvinyl chloride, or from other thermoplastic resins. In the case of hard-to-adhere substrates such as those having surfaces coated with thin heat-ray reflecting metal films, in order to provide good adhesion it is recommended that a ratio of constituents (A-1) and (A-2) in component (A) be in the range of (A-1): (A-2)=(95:5) to (70:30). Further improvement in adhesion can be achieved by coating the surface of the substrate with an appropriate primer and then applying to the primer-coated surface the admixture prepared by mixing the separately stored compositions that compose the multi-component room-temperature-curable silicone rubber composition.

APPLICATION EXAMPLES

The invention will be further described by way of application examples, wherein the content of the components referred to as "parts" means "parts by weight." The adhesion durability against water and curability properties of the multi-component room-temperature-curable silicone rubber composition were determined by the methods described below. It should be understood that the scope of the application of the invention is not limited by the examples given below.

<Method for Evaluating Curability of Multi-Component Room-Temperature-Curable Silicone Rubber Composition>

Curability was measured by forming an admixture prepared by mixing separately stored compositions that compose multi-component room-temperature-curable silicone rubber composition into a 6-mm-thick layer, and then holding the admixture in quiescence at a temperature of 23° C. and at a relative humidity (RH) of 50% and measuring the hardness of the layer at predetermined time intervals by means of a type-A durometer in accordance with JIS K-6253. When the condition where evaluation was impossible because of insufficient curing of the silicone rubber was marked as "NA". For evaluating working time of the multi-component room-temperature-curable silicone rubber composition, the aforementioned admixture was scooped with a metal spatula and the time, known as "snap time", was measured until the composition lost its viscosity and acquired plastic behavior.

<Method for Evaluating Adhesion Durability Against Water>

An adhesion durability test piece according to the method set forth in JIS A 1439 (also referred to as a "type H test piece") was prepared by packing an admixture prepared by mixing separately stored compositions multi-component room-temperature curable silicone rubber composition between two float glass plates (as defined under JIS R3202). Subsequently, the admixture was cured by holding it in quiescence for 7 days at 23° C. and 50% RH. The adhesion durability test pieces were evaluated by measuring characteristics mentioned below, and in addition to that breakage conditions of the silicone rubber were evaluated by visual observation. More specifically, the breakage conditions were evaluated by visually determining the percentage of the surface that corresponded to cohesive failure (CF). When the entire surface of the silicone rubber was subject to cohesive failure, the CF rate was assumed as 100%. When peeling was carried out over the entire surface, the CF rate was assumed as 0%. Accelerated tests for evaluating long term adhesion durability against water were carried out by immersing the respective test pieces for 28 days into water heated to 80° C., then removing the test pieced from water, and evaluating the characteristics mentioned below and the breakage condition in the same manner as described above.

10% modulus of elasticity (tensile strength at 10% elongation) (N/mm$^2$)

maximal tensile strength (N/mm$^2$)

elongation at the maximal load (%)

[Method of Evaluating Adhesion to Heat-Ray Reflecting Film]

An admixture prepared by mixing separately stored compositions that compose the multi-component room-temperature-curable silicone rubber composition was packed in the form of a 1 mm-thick and 10 mm-long layer between a heat-ray reflecting thin metal film vapor-deposited onto the surface of a PET film and a 25 mm-wide aluminum test panel (Almite A5052P), and the composition was cured by holding it in quiescence for 7 days at 23° C. and 50% RH. The tensile shear strength of the obtained specimen was measured.

[Method of Evaluating Adhesion to Heat-Ray Reflecting Glass]

An admixture prepared by mixing separately stored compositions that compose the multi-component room-temperature-curable silicone rubber composition was applied in the form of a 10 mm-thick and 10 mm-wide layer onto a heat-ray reflecting thin metal film vapor-deposited onto a glass pane, and the admixture was cured by holding it in quiescence for 24 hours and for 3 days at 23° C. and 50% RH. Following this, the silicone rubber was removed by peeling, And the breakage conditions were evaluated by visual observation. The condition of cohesive failure over the entire surface was marked CF; the condition of separation over the interface was marked AF; and the condition where evaluation was impossible because of insufficient curing of the silicone rubber was marked as NA.

Reference Example 1

Preparation of Adhesion Promoter A

A 1-liter flask equipped with a refluxing cooler was loaded with 179 g (1.0 mole) of 3-aminopropyl trimethoxysilane, 472 g (2.0 moles) of 3-glycidoxypropyl trimethoxysilane, and 64 g (2.0 moles) of methanol. The components were gradually heated under stirring conditions, and a reaction was caused at the reflux temperature of methanol. The reaction product was cooled to room temperature. The $^{29}$Si NMR spectral analysis of the product obtained after removal of methanol confirmed that the product comprised a methoxy group-containing carbasilatrane derivative of the formula given below that showed peaks originating from the respective stereoisomers at −62.5 ppm, −63.8 ppm, and −64.9 ppm. The content of the carbasilatrane derivative was 86 wt. %. The product obtained in this example was designated as "adhesion promoter A".

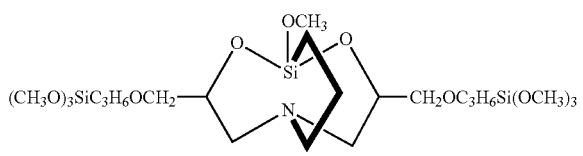

Application Example 1

A silicone rubber base was prepared by uniformly mixing 100 parts of a dimethylpolysiloxane capped at both molecular terminals with silanol groups (viscosity of 12,000 mPa·s) and 100 parts by weight of a calcium carbonate powder surface treated with fatty acids (a product of Shiraishi Industries Co., Ltd., trademark "Hakuenka CCR", average grain diameter 0.08 μm). A catalytic composition was prepared by mixing the following components in proportions shown in Table 1: 1,6-bis(trimethoxysilyl) hexane, dimethyltin dineodecanoate, the adhesion promoter A obtained in Reference Example 1, and N-(β-aminoethyl)aminopropyl trimethoxysilane. The silicone rubber base was mixed with the catalytic composition in a weight ratio of 100:3.5, and the admixture was subjected to defoaming under a reduced pressure. The obtained admixture was evaluated with regard to curability, adhesion durability against water, and adhesion to a heat-ray reflecting film and heat-ray reflecting glass. The results of evaluation of curability are shown in Table 2. Evaluation results of adhesion durability against water, and adhesion to a heat-ray reflecting film and heat-ray reflecting glass are shown in Table 4.

Application Example 2

An admixture of a silicone rubber base and a catalytic composition was prepared in the same manner as in Application Example 1, except that 100 parts of the dimethylpolysiloxane capped at both molecular terminals with silanol groups (viscosity of 12,000 mPa·s) were replaced by 80 parts of a dimethylpolysiloxane capped at both molecular terminals with silanol groups (viscosity of 13,000 mPa·s) and 20 parts of a dimethylpolysiloxane capped at one molecular terminal with a silanol group and at the other molecular terminal with a methyl group (viscosity of 13,000 mPa·s). Curability, adhesion durability against water, and adhesion to heat-ray reflecting glass were evaluated in the same manner as in Application Example 1. The results of evaluation of curability are shown in Table 2. Evaluation results of adhesion durability against water, and adhesion to a heat-ray reflecting glass are shown in Table 4.

Application Example 3

An admixture of a silicone rubber base and a catalytic composition was prepared in the same manner as in Application Example 2, except that the dimethylpolysiloxane capped at both molecular terminals with silanol groups (viscosity of 13,000 mPa·s) was used in an amount of 90 parts and that the dimethylpolysiloxane capped at one molecular terminal with a silanol group and at the other molecular terminal with a methyl group (viscosity of 13,000 mPa·s) was used in an amount of 10 parts. Curability, adhesion durability against water, and adhesion to a heat-ray reflecting film and heat-ray reflecting glass were evaluated in the same manner as in Application Example 1. The results of evaluation of curability are shown in Table 2. Evaluation results of adhesion durability against water, and adhesion to a heat-ray reflecting film and heat-ray reflecting glass are shown in Table 4.

Application Example 4

A silicone rubber base was prepared by uniformly mixing 100 parts of a dimethylpolysiloxane capped at both molecular terminals with silanol groups (viscosity of 12,000 mPa·s) and 100 parts by weight of a calcium carbonate powder surface treated with fatty acids (a product of Shiraishi Industries Co., Ltd., trademark "Hakuenka CCR", average grain diameter 0.08 μm). A catalytic composition was prepared by mixing the following components in proportions shown in Table 1: N-decyltrimethoxysilane, dimethyltin dineodecanoate, the Adhesion promoter A obtained in Reference Example 1, and N-(β-aminoethyl)aminopropyl trimethoxysilane. The silicone rubber base was mixed with the catalytic composition in a weight ratio of 100:3.5, and the admixture was subjected to defoaming under a reduced pressure. The obtained admixture was evaluated with regard to curability, adhesion durability against water, and adhesion to a heat-ray reflecting film and heat-ray reflecting glass. The results of evaluation of curability are shown in Table 2. Evaluation results of adhesion durability against water, and adhesion to a heat-ray reflecting film and heat-ray reflecting glass are shown in Table 4.

Comparative Examples 1 to 6

An admixture of a silicone rubber base and a catalytic composition was prepared in the same manner as in Application Example 1, except that the catalytic composition components were replaced by those shown in Table 1. Curability, adhesion durability against water, and adhesion to a heat-ray reflecting glass were evaluated. The results of evaluation of curability are shown in Table 3. Evaluation results of adhesion durability against water, and adhesion to the heat-ray reflecting glass are shown in Table 5.

Comparative Example 7

100 parts of a diorganopolysiloxane capped at both molecular terminals with methyldimethoxysilyl groups (viscosity of 12,000 mPa·s) were mixed to uniformity with 100 parts of a calcium carbonate powder surface treated with fatty acids (a product of Shiraishi Industries Co., Ltd., trademark "Hakuenka CCR", average grain diameter 0.08 μm). The obtained admixture was combined with 2 parts of 1,6-bis (trimethoxysilyl) hexane, adhesion promoter A obtained in Reference Example 1, and 1 part of a diisopropoxy bis(ethyl acetate), and the components were uniformly mixed under moisture-isolated conditions. Following this, the obtained admixture was tested with regard to curability in the same manner as in Application Example 1. The results of the tests are shown in Table 3. However, the snap time was not measured. Adhesion durability against water was measured in the same manner as in Application Example 1, except that the specimens for testing adhesion durability against water were obtained by curing the composition by holding it in quiescence for 14 days at 23° C. and 50% RH. The results are shown in Table 5. The composition was also evaluated with regard to adhesion to heat-ray reflecting glass by curing the composition by holding it in quiescence for 7 days at 23° C. and 50% RH. The results corresponded to CF conditions.

TABLE 1

|  | Appl. Ex. | | Comparative Examples | | | | | |
|---|---|---|---|---|---|---|---|---|
|  | 1 | 4 | 1 | 2 | 3 | 4 | 5 | 6 |
| 1,6-bis (trimethoxysilyl) hexane (parts) | 74 | — | — | 74 | 74 | 74 | 74 | 74 |
| n-decyltrimethoxysilane (parts) | — | 74 | — | — | — | — | — | — |
| n-propyl orthosilicate (parts) | — | — | 74 | — | — | — | — | — |
| Dimethyltin dineodecanoate (parts) | 1 | 1 | 1 | 1 | 1 | 1 | 1 | 1 |
| Adhesion promoter A (parts) | 15 | 15 | 15 | 25 | — | — | 22.5 | 2.5 |
| N-(β-aminoethyl) amine (parts) | 10 | 10 | 10 | — | 25 | — | 2.5 | 22.5 |
| γ-aminopropyl trimethoxysilane (parts) | — | — | — | — | — | 11 | — | — |
| γ-glycidoxypropyl trimethoxysilane (parts) | — | — | — | — | — | 14 | — | — |

TABLE 2

|  | Application Examples | | | |
|---|---|---|---|---|
|  | 1 | 2 | 3 | 4 |
| Snap time (min.) | 40 | 30 | 60 | 60 |
| 1 hour curing (JIS Type A) | NA | NA | NA | NA |
| 2 hour curing (JIS Type A) | 13 | 19 | 12 | 27 |
| 3 hour curing (JIS Type A) | 25 | 27 | 25 | 37 |
| 4 hour curing (JIS Type A) | 33 | 31 | 32 | 41 |
| 5 hour curing (JIS Type A) | 38 | 33 | 36 | 44 |
| 24 hour curing (JIS Type A) | 55 | 41 | 48 | 50 |

TABLE 3

|  | Comparative Example | | | | | | |
|---|---|---|---|---|---|---|---|
|  | 1 | 2 | 3 | 4 | 5 | 6 | 7 |
| Snap time (min.) | 40 | 270 | 25 | 70 | 100 | 30 | — |
| 1 hour curing (JIS Type A) | 2 | NA | 28 | NA | NA | 25 | NA |
| 2 hour curing (JIS Type A) | 15 | NA | 39 | 3 | NA | 37 | NA |
| 3 hour curing (JIS Type A) | 28 | NA | 45 | 16 | NA | 43 | NA |
| 4 hour curing (JIS Type A) | 35 | NA | 48 | 26 | 5 | 46 | NA |
| 5 hour curing (JIS Type A) | 38 | NA | 50 | 35 | 15 | 49 | NA |
| 24 hour curing (JIS Type A) | 50 | 35 | 58 | 52 | 53 | 60 | NA |

TABLE 4

|  |  | Appl. Ex. 1 | Appl. Ex. 2 | Appl. Ex. 3 | Appl. Ex. 4 |
|---|---|---|---|---|---|
| Prior to immersion | 10% modulus of elasticity (N/mm$^2$) | 0.50 | 0.25 | 0.34 | 0.36 |
|  | Maximal tensile strength (N/mm$^2$) | 1.20 | 1.13 | 1.22 | 1.04 |
|  | Elongation at maximal load (%) | 30 | 80 | 53 | 71 |
|  | CF rate (%) | 100 | 100 | 100 | 100 |
|  | Adhesion to heat-ray reflecting film Shear tensile strength (N/mm$^2$) | 0.76 | — | 1.05 | — |
|  | Adhesion to heat-ray reflecting glass |  |  |  |  |
|  | Curing time   24 hours | CF | CF | CF | CF |
|  | Curing time   3 days | CF | CF | CF | CF |
| After 28 days of immersion into 80° C. water | 10% modulus of elasticity (N/mm$^2$) | 0.37 | 0.11 | 0.23 | 0.14 |
|  | Maximal tensile strength (N/mm$^2$) | 0.70 | 0.65 | 0.61 | 0.70 |
|  | Elongation at maximal load (%) | 35 | 160 | 56 | 276 |
|  | CF rate (%) | 100 | 60 | 95 | 100 |

TABLE 5

|  |  | Comparative Examples | | | | | | |
|---|---|---|---|---|---|---|---|---|
|  |  | 1 | 2 | 3 | 4 | 5 | 6 | 7 |
| Prior to immersion | 10% modulus of elasticity (N/mm$^2$) | 0.40 | 0.45 | 0.43 | 0.53 | 0.41 | 0.41 | 0.45 |
|  | Maximal tensile strength (N/mm$^2$) | 1.00 | 1.05 | 1.21 | 1.14 | 0.95 | 1.16 | 1.25 |
|  | Elongation at maximal load (%) | 70 | 31 | 34 | 31 | 31 | 35 | 50 |
|  | CF rate (%) | 100 | 100 | 100 | 100 | 100 | 100 | 100 |
|  | Adhesion to heat-ray reflecting glass |  |  |  |  |  |  |  |
|  | Curing time   24 hours | CF | AF | CF | AF | AF | CF | NA |
|  | Curing time   3 days | CF | AF | CF | CF | AF | CF | NA |
| After 28 days of immersion into 80° C. water | 10% modulus of elasticity (N/mm$^2$) | 0.25 | 0.31 | 0.15 | 0.27 | 0.23 | 0.16 | 0.29 |
|  | Maximal tensile strength (N/mm$^2$) | 0.51 | 0.71 | 0.35 | 0.55 | 0.60 | 0.38 | 0.63 |
|  | Elongation at maximal load (%) | 80 | 50 | 33 | 50 | 33 | 36 | 43 |
|  | CF rate (%) | 45 | 100 | 30 | 60 | 100 | 40 | 55 |

INDUSTRIAL APPLICABILITY

The multi-component room-temperature-curable silicone rubber composition of the invention demonstrates extremely rapid adhesion to various substrates such as metal, etc., and after curing, the cured body of the composition shows excellent and long term adhesion durability against water and maintains adhesion strength even under harsh environmental conditions such as immersion in hot water practically without loss of rubber-like properties. Since the multi-component composition has such characteristics, it is suitable for use as sealing and adhesive agents for structural materials in outdoor and near-water surroundings and it also improves productivities of those structural materials. For example, the composition may be used as a secondary sealing material for multiple-pane insulating glass units, as a glass sealing and adhesion material, as an edge sealant, and as a secondary sealant of multiple-pane insulating glass units that having intermediate plastic films as disclosed in Kokai H10-101381. Another suitable applications are a sealant for bathtubs or a sealant or an adhesive for light-unit for vehicles such as automotives.

The multiple-pane insulating glass unit normally have four peripheral sides that support metal spacers with a drying agent, wherein a primary sealant such as butyl resin is placed between the glass and the metal spacers to provide resistance to penetration of water. The secondary sealing agent in the form of a room-temperature-curable silicone rubber composition is injected into spaces between the outer peripheries of the metal spacers and pair of glass panes, whereby the spacers firmly adhere to the glass panes and serve as protection for the primary sealant. In such construction, the material of the secondary sealant should have a high modulus of elasticity. In order to satisfy long term warranty of the construction, the secondary sealant should provide long term adhesion durability against water. Such properties are especially needed when multiple-pane insulating glass is used in conjunction with a sash frame where the water-draining hole provided in the sash is clogged, whereby the secondary sealant can be immersed in water and remain in a water-immersion state over a long period of time in the outdoor environment. It is recommended that the sealant be able to adhere to hard-to-adhere substrates such as substrates having surfaces coated with thin vapor-deposited metal films when the multiple-pane insulating glass unit having heat-ray reflecting glass pane or heat-ray reflecting intermediate plastic films as described in Kokai H10-101381. Furthermore, in the production of multiple-pane insulating glass units, the operation time greatly depends on how quickly the secondary sealant can cure.

The composition of the invention can also be used as a sealant, coating, or adhesive for electric and electronic parts.

The invention claimed is:

1. A multi-component room-temperature-curable silicone rubber composition comprising at least:
(A) 100 parts by weight of a diorganopolysiloxane that has a viscosity in the range of 20 to 1,000,000 mPa·s at 25° C. and that comprises: 20 to 100 parts by weight of a diorganopolysiloxane (A-1) capped at both molecular terminals with alkoxysilyl groups or hydroxysilyl groups, and 0 to 80 parts by weight of a diorganopolysiloxane (A-2) capped at one molecular terminal with an alkoxysilyl group or a hydroxysilyl group and capped at the other molecular terminal with an alkyl group or an alkenyl group;
(B) a methoxy group-containing silicon compound comprising a bis(methoxysilyl)alkane or an organotrimethoxysilane (except amino group containing organotrimethoxysilane) (B-1), a methoxy group-containing carbasilatrane derivative (B-2), and a N-(β-aminoalkyl) aminoalkylorganodimethoxysilane or N-(β-aminoalkyl) aminoalkyltrimethoxysilane (B-3) (wherein constituent (B-1) is used in an amount of 0.5 to 15 parts by weight per 100 parts by weight of component (A), wherein the total amount of constituents (B-2) and (B-3) is in the range of 0.1 to 10 parts by weight per 100 parts by weight of component (A), and wherein the weight ratio of constituent (B-2) to constituent (B-3) is in the range of (20:80) to (80:20)); and
(C) 0.001 to 20 parts by weight of a curing catalyst,
the composition being packaged as two or more separately stored compositions wherein none of said separately stored compositions contain all said components (A), (B), and (C) simultaneously; and
wherein said methoxy group-containing carbasilatrane derivative (B-2) is of the following general formula:

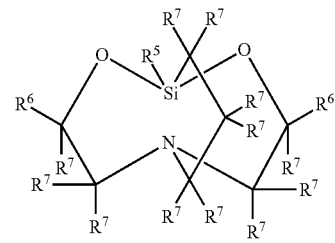

wherein $R^5$ is an alkyl group having 1 to 10 carbon atoms or a methoxy group; each $R^7$ is independently selected from a hydrogen atom or an alkyl group having 1 to 10 carbon atoms; and each $R^6$ is independently selected from the groups represented by the following formulae:

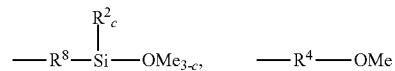

wherein $R^8$ is an alkylene or substituted alkylene group having 2 to 10 carbon atoms, or an alkyleneoxyalkylene group; and OMe is a methoxy group; $R^2$ is a univalent hydrocarbon group, a halogenated hydrocarbon group, or a cyanoalkyl group; $R^4$ is an alkylene or substituted alkylene group having 2 to 10 carbon atoms; and "c" is 0, 1, or 2.

2. The multi-component room-temperature-curable silicone rubber composition of claim 1, wherein said constituent (B-1) is a bis(methoxysilyl)alkane selected from the group consisting of 1,6-bis (trimethoxysilyl) hexane, 1,7-bis (trimethoxysilyl) heptane, 1,8-bis (trimethoxysilyl) octane, 1,9-bis (trimethoxysilyl) nonane, and 1,10-bis (trimethoxysilyl) decane.

3. The multi-component room-temperature-curable silicone rubber composition of claim 1, wherein said component (C) is an organic tin compound.

4. The multi-component room-temperature-curable silicone rubber composition of claim 1, wherein the weight ratio of constituent (A-1) to constituent (A-2) is in the range of (95:5) to (70:30).

5. The multi-component room-temperature-curable silicone rubber composition of claim 1, further comprising a fine powder of calcium carbonate (D) in the amount of 10 to 200 parts by weight per 100 parts by weight of component (A).

6. The multi-component room-temperature-curable silicone rubber composition of claim 5, being packaged as two separately stored compositions comprising a composition (I) composed of components (A) and (D) but does not contain components (B) and (C) and a composition (II) that contains components (B) and (C) but does not contain component (A).

7. The multi-component room-temperature-curable silicone rubber composition of claim 1, further defined as a construction sealant.

8. The multi-component room-temperature-curable silicone rubber composition of claim 1, further defined as an adhesive material for use in a multiple-pane insulating glass unit.

9. The multi-component room-temperature-curable silicone rubber composition of claim 8, that comprises a secondary sealing material for use in the multiple-pane insulating glass unit.

10. The multi-component room-temperature-curable silicone rubber composition of claim 2, wherein the weight ratio of constituent (A-1) to constituent (A-2) is in the range of (95:5) to (70:30).

11. The multi-component room-temperature-curable silicone rubber composition of claim 3, wherein the weight ratio of constituent (A-1) to constituent (A-2) is in the range of (95:5) to (70:30).

12. The multi-component room-temperature-curable silicone rubber composition of claim 2, further comprising a fine powder of calcium carbonate (D) in the amount of 10 to 200 parts by weight per 100 parts by weight of component (A).

13. The multi-component room-temperature-curable silicone rubber composition of claim 3, further comprising a fine powder of calcium carbonate (D) in the amount of 10 to 200 parts by weight per 100 parts by weight of component (A).

14. The multi-component room-temperature-curable silicone rubber composition of claim 4, further comprising a fine powder of calcium carbonate (D) in the amount of 10 to 200 parts by weight per 100 parts by weight of component (A).

15. The multi-component room-temperature-curable silicone rubber composition of claim 10, further comprising a fine powder of calcium carbonate (D) in the amount of 10 to 200 parts by weight per 100 parts by weight of component (A).

16. The multi-component room-temperature-curable silicone rubber composition of claim 3 further comprising a fine powder of calcium carbonate (D) in the amount of 10 to 200 parts by weight per 100 parts by weight of component (A).

17. The multi-component room-temperature-curable silicone rubber composition of claim 11, further comprising a fine powder of calcium carbonate (D) in the amount of 10 to 200 parts by weight per 100 parts by weight of component (A).

18. The multi-component room-temperature-curable silicone rubber composition of claim 1, wherein said component (C) is an organic salt of a metal selected from the group of tin, titanium, zirconium, iron, antimony, bismuth, and manganese.

19. The multi-component room-temperature-curable silicone rubber composition of claim 1, wherein said alkyl group of $R^5$ is further defined as a methyl, ethyl, propyl, butyl, or octyl group.

20. The multi-component room-temperature-curable silicone rubber composition of claim 1, wherein said alkyl group of $R^7$ is further defined as a methyl, ethyl, propyl, butyl, or octyl group.

21. The multi-component room-temperature-curable silicone rubber composition of claim 1, wherein said alkyleneoxyalkylene group of $R^8$ is a methoxymethyl group, a methoxyethyl group, an ethoxyethyl group, or an ethoxyethoxy group.

22. The multi-component room-temperature-curable silicone rubber composition of claim 1, wherein said alkylene group and said substituted alkylene group of $R^8$ have 5 to 7 carbon atoms.

* * * * *